United States Patent
Stoever et al.

(10) Patent No.: US 9,309,869 B2
(45) Date of Patent: Apr. 12, 2016

(54) SOLAR THERMAL ENERGY GENERATING PLANT AND METHOD FOR OBTAINING ENERGY BY MEANS OF A SOLAR THERMAL ENERGY GENERATING PLANT

(75) Inventors: Brian Stoever, Recklinghausen (DE); Christian Bergins, Datteln (DE); Juergen Klebes, Wesel (DE); Marinus Joormann, Duisburg (DE)

(73) Assignee: MITSUBISHI HITACHI POWER SYSTEMS EUROPE GMBH, Duisburg (DE)

( * ) Notice: Subject to any disclaimer, the term of this patent is extended or adjusted under 35 U.S.C. 154(b) by 216 days.

(21) Appl. No.: 14/001,491

(22) PCT Filed: Dec. 28, 2011

(86) PCT No.: PCT/EP2011/074171
§ 371 (c)(1),
(2), (4) Date: Oct. 28, 2013

(87) PCT Pub. No.: WO2012/113483
PCT Pub. Date: Aug. 30, 2012

(65) Prior Publication Data
US 2014/0290245 A1    Oct. 2, 2014

(30) Foreign Application Priority Data

Feb. 25, 2011 (DE) .......................... 10 2011 000 946

(51) Int. Cl.
*F03G 6/00* (2006.01)
*F01K 7/34* (2006.01)
*F01K 7/16* (2006.01)

(52) U.S. Cl.
CPC . *F03G 6/003* (2013.01); *F01K 7/16* (2013.01); *F03G 6/00* (2013.01); *Y02E 10/46* (2013.01)

(58) Field of Classification Search
CPC ............ F03G 6/003; F03G 6/00; F01K 7/16; Y02E 10/46
USPC .................... 60/641.8, 641.15, 653, 677, 679
See application file for complete search history.

(56) References Cited

U.S. PATENT DOCUMENTS

| | | | | |
|---|---|---|---|---|
| 8,627,664 | B2 * | 1/2014 | Katz et al. | 60/641.8 |
| 2007/0157614 | A1 * | 7/2007 | Goldman | 60/641.15 |
| 2010/0162700 | A1 * | 7/2010 | Birnbaum et al. | 60/641.8 |
| 2012/0255300 | A1 * | 10/2012 | Birnbaum et al. | 60/641.8 |

FOREIGN PATENT DOCUMENTS

| | | |
|---|---|---|
| DE | 10 2009 056707 A1 | 10/2010 |
| WO | WO 2010/082206 A1 | 7/2010 |

OTHER PUBLICATIONS

Mueller et al., "Solare Farmkraftwerke und Directverdampfung in Kollektoren", Forschungsverbund Sonnenenergie, Dec. 31, 1993, pp. 57-64, XP000647082.
International Search Report mailed Sep. 21, 2012 for International Application No. PCT/EP2011/074171 filed Dec. 28, 2011.

* cited by examiner

*Primary Examiner* — Hoang Nguyen
(74) *Attorney, Agent, or Firm* — Knobbe Martens Olson & Bear LLP (57) ABSTRACT

In the case of a solar thermal energy generating plant with a first solar array, using water as a heat transfer medium, a water separator, arranged downstream of the first solar array, and a high-pressure turbine, it is intended to achieve the effect of increasing the efficiency of the solar thermal energy generating plant. This is achieved by a first superheater for overheating the steam leaving the water separator being arranged between the water separator and the high-pressure turbine.

16 Claims, 8 Drawing Sheets

SOLAR THERMAL ENERGY GENERATING PLANT AND METHOD FOR OBTAINING ENERGY BY MEANS OF A SOLAR THERMAL ENERGY GENERATING PLANT

RELATED APPLICATIONS

This application is the U.S. National Phase of Application No. PCT/EP2011/074171 with the English title "SOLARTHERMAL ENERGY GENERATION PLANT AND METHOD FOR ENERGY PRODUCTION BY MEANS OF A SOLARTHERMAL ENERGY GENERATION PLANT" filed Dec. 28, 2011, published in German on Aug. 30, 2012, which designated the United States, and which claims the benefit of German Application No. 10 2011 000 946.9 filed Feb. 25, 2011.

The invention relates to a solar thermal energy generating plant comprising a first solar array, using water as a heat transfer medium, a water separator, arranged downstream of the first solar array, and a high-pressure turbine.

The invention also relates to a method for obtaining energy by means of a solar thermal energy generating plant, in which steam is generated in a first solar array, using water as a heat transfer medium, the steam generated in the solar array is fed to a water separator, in which a fraction of water is extracted from the steam, and the steam leaving the water separator is fed to a high-pressure turbine.

Solar thermal energy generating plants with line-focussing solar technology, such as for example parabolic trough technology or Fresnel technology, are usually operated in such a way that a thermal oil flows through a solar array, the thermal oil is heated in the solar array by the inflowing solar energy and this heated thermal oil is subsequently used outside the solar array for transforming water into a vaporous state, in order to feed this steam to a turbine or to a number of turbines for generating energy. However, due to the use of the thermal oil and the circuit necessary for it, this method is complex and expensive.

In order to solve this problem there have been developed solar thermal energy generating plants in which thermal oil is not used as the heat transfer medium in the solar array but instead water, which is heated directly in the solar array in such a way that it is transformed into a vaporous state, in particular into saturated steam, and after passing a water separator is fed directly to the means of obtaining energy, i.e. the downstream high-pressure turbine. The fact that an own circuit for the thermal oil as the heat transfer medium is no longer necessary here means that the size of the plant can be reduced significantly, which in turn leads to a lowering of the costs. A disadvantage of the previously known solar thermal energy generating plants with solar arrays that use water as a heat transfer medium is, however, the previously relatively low achievable efficiency in respect of energy generation.

The object of the invention is therefore to provide a solution by means of which the efficiency of solar thermal energy generating plants using water as a heat transfer medium can be increased.

In the case of a solar thermal energy generating plant of the type referred to more specifically at the beginning, the object is achieved according to the invention by a first superheater for overheating the steam leaving the water separator being arranged between the water separator and the high-pressure turbine.

In the case of a method of the type referred to in more detail at the beginning, the object is achieved according to the invention by the steam being fed to a first superheater, in which the steam leaving the water separator is overheated, before entering the high-pressure turbine.

Expedient refinements and advantageous developments of the invention are specified in the subclaims.

The provision of a first superheater before the steam enters the high-pressure turbine has the effect that the steam entering the superheater as saturated steam is heated, in particular overheated, and transformed into what is known as live steam, the live steam having a higher temperature and a lower moisture content than the saturated steam entering the superheater. This allows the efficiency in respect of energy generation in the downstream high-pressure turbine to be increased significantly. The overheating of the saturated steam in the first superheater also allows the avoidance of droplet erosion on the blades of the downstream high-pressure turbine due to the steam introduced into the high-pressure turbine, whereby the effects of wear on the high-pressure turbine can be reduced and the lifetime of the high-pressure turbine can be increased as a result.

According to an advantageous refinement of the invention, a medium-pressure turbine or a low-pressure turbine is arranged downstream of the high-pressure turbine, a second superheater being arranged between the high-pressure turbine and the medium-pressure turbine or between the high-pressure turbine and the low-pressure turbine. The steam leaving the high-pressure turbine can consequently be fed to a second superheater before entering a downstream medium-pressure turbine or a downstream high-pressure turbine, so that the steam is overheated once again after leaving the high-pressure turbine, whereby its temperature is increased again before entering the downstream medium-pressure turbine or low-pressure turbine, and the efficiency of the energy generating plant as a whole can be increased further as a result.

Alternatively, it is provided with preference that a medium-pressure turbine is arranged downstream of the high-pressure turbine and a low-pressure turbine is arranged downstream of the medium-pressure turbine, a second superheater being arranged between the high-pressure turbine and the medium-pressure turbine and a third superheater being arranged between the medium-pressure turbine and the low-pressure turbine. The steam leaving the high-pressure turbine can consequently be overheated in a second superheater before entering the medium-pressure turbine arranged downstream of the high-pressure turbine and can be overheated a further time in a third superheater after leaving the medium-pressure turbine and before entering the downstream low-pressure turbine. This allows the efficiency of the energy generating plant to be increased further.

It is also alternatively possible that a thermal storage unit or a seawater desalination plant or an adsorption refrigeration machine is arranged downstream of the high-pressure turbine, a second superheater being arranged between the high-pressure turbine and the thermal storage unit or the seawater desalination plant or the adsorption refrigeration machine. The steam leaving the high-pressure turbine can consequently be fed to a thermal storage unit or a seawater desalination plant or an adsorption refrigeration machine, and be further used there, directly or after passing a downstream medium-pressure turbine and/or a low-pressure turbine. The thermal storage unit may be, for example, a steam storage unit, a warm water storage unit, an oil or salt storage unit. Furthermore, the steam may also be used for feeding into a district heating or process heating system.

According to a further advantageous refinement of the invention, the first superheater and/or the second superheater and/or the third superheater is/are a steam-steam heat exchanger.

In the case of the steam-steam heat exchanger, the steam is overheated with a steam before entering the high-pressure turbine and/or medium-pressure turbine and/or low-pressure turbine. The steam-steam heat exchanger is preferably designed as a condenser.

For generating the additional steam, an additional solar array may be provided, by means of which the steam-steam heat exchanger can be operated. In the additional solar array, in which water is likewise used as a heat transfer medium, steam that has a higher temperature and a higher pressure than steam leaving the first solar array is generated, so that the steam leaving the first solar array can be overheated by means of the steam generated by the additional solar array, whereby the cost-effectiveness of the method and the energy generating plant can be increased further.

It is also possible that the first superheater and/or the second superheater and/or the third superheater is/are a second solar array, so that the steam is passed through a second solar array, in which the steam is overheated, before entering the high-pressure turbine and/or medium-pressure turbine and/or low-pressure turbine, and as a result its temperature is increased before entering the downstream high-pressure turbine and/or medium-pressure turbine and/or low-pressure turbine.

Furthermore, it is provided with preference that a combustion chamber is arranged downstream of the first superheater and/or second superheater and/or third superheater formed as a steam-steam heat exchanger and/or the first superheater and/or second superheater and/or third superheater formed as a second solar array, so that, after the steam has left the superheater and before it is conducted into a high-pressure turbine and/or medium-pressure turbine and/or low-pressure turbine, the steam is passed through a combustion chamber and further heated there, in particular overheated, it being possible by means of the combustion chamber for the temperature of the steam before entering the high-pressure turbine and/or medium-pressure turbine and/or low-pressure turbine to be regulated very exactly, and consequently the steam to be conditioned. Gas, oil, coal, biomass or biogas may be used for example as the fuel in the combustion chamber.

It is furthermore also possible that the first superheater and/or the second superheater and/or the third superheater is/are themselves formed as a combustion chamber.

The invention is explained in more detail below on the basis of preferred embodiments with reference to the accompanying drawings, in which.

Figure 1:
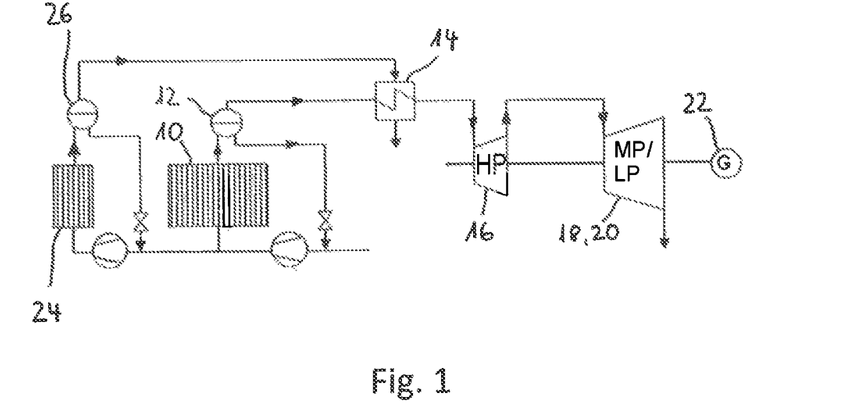
FIG. 1 shows a schematic representation of a solar thermal energy generating plant according to the invention in a first embodiment.

FIG. 1 shows a schematic representation of a solar thermal energy generating plant according to the invention as provided by a first embodiment. Here, steam is generated in the form of saturated steam in a first solar array 10, using water as a heat transfer medium, and after leaving the first solar array 10 is fed to a first water separator 12, in which water still contained in the steam is separated and returned to the first solar array 10. The steam is subsequently fed to a first superheater 14, which in the case of the embodiment shown here is formed as a steam-steam heat exchanger. In the first superheater 14, the steam is overheated, so that the saturated steam entering the superheater 14 is transformed into what is known as live steam, with a higher temperature and a lower moisture content than the saturated steam. Subsequently, the steam is fed to a high-pressure turbine 16 and a medium-pressure turbine or low-pressure turbine 18, 20, which are connected to a generator 22. The first superheater 14, formed as a steam-steam heat exchanger, is operated with a steam (saturated steam) generated in an additional solar array 24, the steam generated in the additional solar array 24 having a higher temperature and a higher pressure than the steam generated in the first solar array 10. Preferably, the steam generated in the first solar array 10 has a pressure of 60 bar and the steam generated in the additional solar array 24 has a pressure of 80 bar. Arranged between the additional solar array 24 and the first superheater 14 is a second water separator 26, in which water is separated from the steam leaving the additional solar array and is returned to the additional solar array 24.

Figure 2:
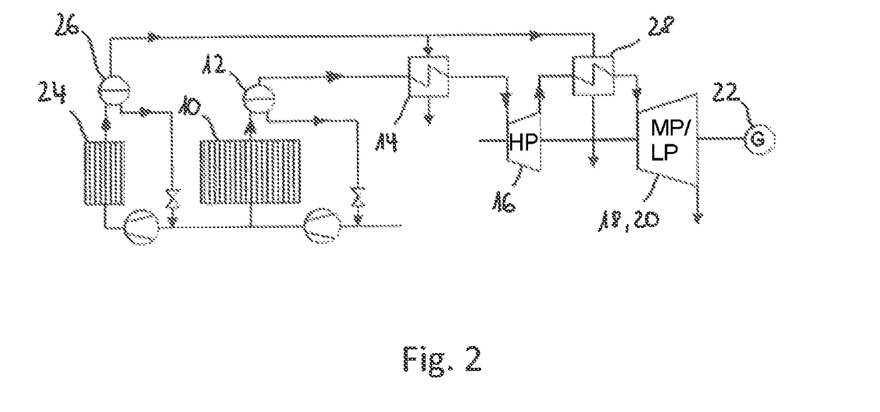
FIG. 2 shows a schematic representation of a solar thermal energy generating plant according to the invention in a second embodiment.

The second embodiment, shown in FIG. 2, corresponds substantially to the embodiment shown in FIG. 1, a second superheater 28, which is formed as a steam-steam heat exchanger, being additionally provided here between the high-pressure turbine 16 and the medium-pressure turbine 18 or the low-pressure turbine 20. The second superheater 28 is likewise operated with steam (saturated steam) generated in the additional solar array 24, in order to overheat again the steam leaving the high-pressure turbine 16 before entering the medium-pressure turbine 18 or the low-pressure turbine 20.

Figure 3:
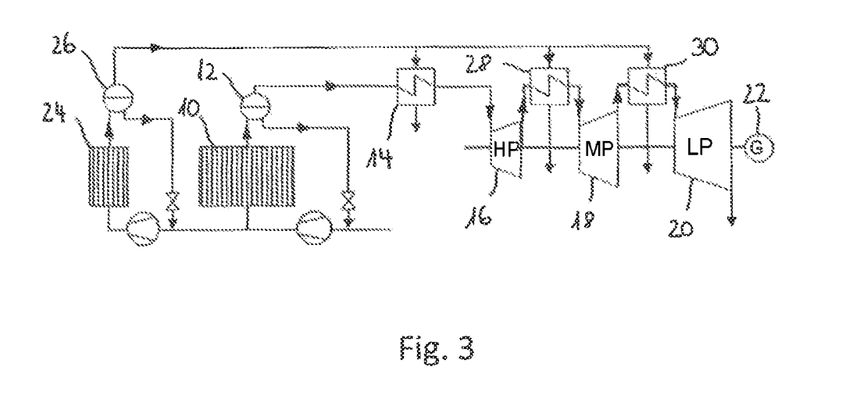
FIG. 3 shows a schematic representation of a solar thermal energy generating plant according to the invention in a third embodiment.

The third embodiment, shown in FIG. 3, corresponds substantially to the second embodiment, shown in FIG. 2, a medium-pressure turbine 18 and a low-pressure turbine 20 being provided here, and a third superheater 30 in the form of a steam-steam heat exchanger, which is likewise operated with the steam (saturated steam) generated in the additional solar array 24, being formed between the medium-pressure turbine 18 and the low-pressure turbine 20, in order to overheat again the steam leaving the medium-pressure turbine 18 before entering the low-pressure turbine 20.

Figure 4:
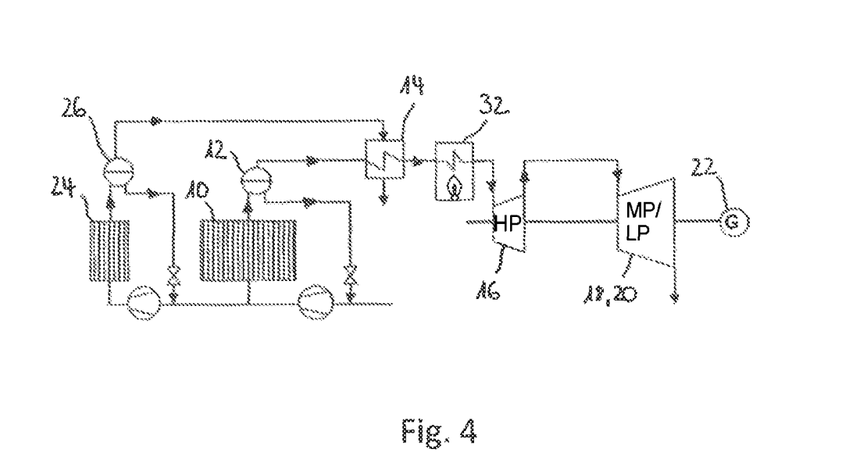
FIG. 4 shows a schematic representation of a solar thermal energy generating plant according to the invention in a fourth embodiment.

The fourth embodiment, shown in FIG. 4, corresponds substantially to the first embodiment, shown in FIG. 1, a combustion chamber 32 being additionally arranged here directly downstream of the first superheater 14, it being possible by means of the combustion chamber 32 for the steam leaving the first superheater 14 to be conditioned before entering the high-pressure turbine 16.

Figure 5:
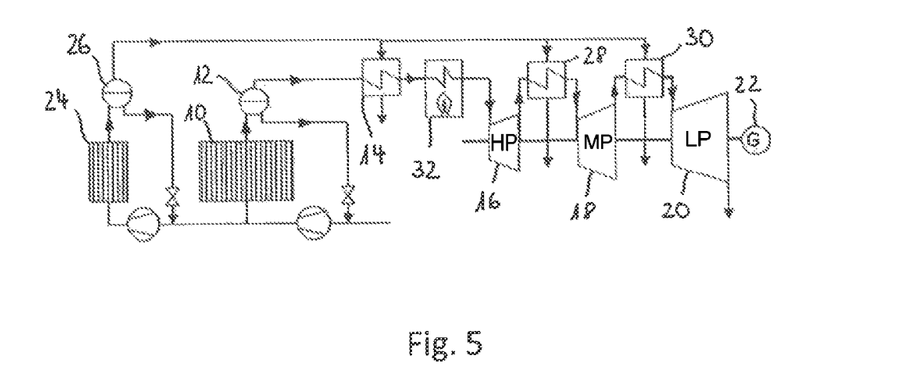
FIG. 5 shows a schematic representation of a solar thermal energy generating plant according to the invention in a fifth embodiment.

The fifth embodiment, shown in FIG. 5, corresponds substantially to the third embodiment, shown in FIG. 3, a combustion chamber 32 also being arranged here downstream of the first superheater 14.

Figure 6:
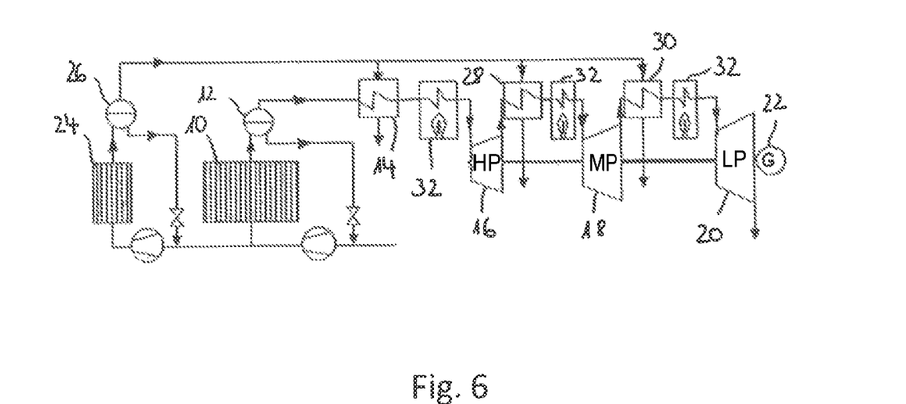
FIG. 6 shows a schematic representation of a solar thermal energy generating plant according to the invention in a sixth embodiment.

The sixth embodiment, shown in FIG. 6, corresponds substantially to the fifth embodiment, shown in FIG. 5, a combustion chamber 32 being additionally arranged here respectively downstream of the second superheater 28 and the third superheater 30.

Figure 7:
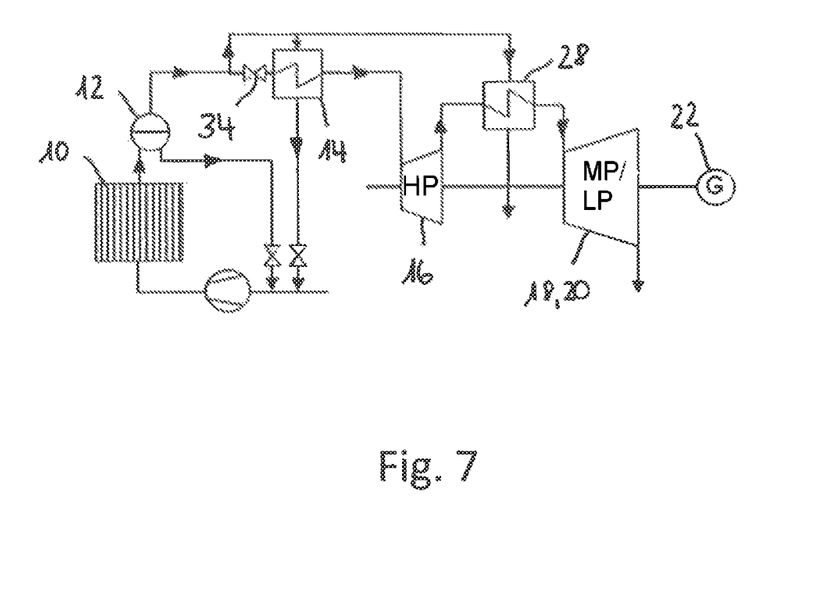
FIG. 7 shows a schematic representation of a solar thermal energy generating plant according to the invention in a seventh embodiment.

In the case of the seventh embodiment, shown in FIG. 7, a first superheater 14 in the form of a steam-steam heat exchanger is arranged between the water separator 12 and the high-pressure turbine 15. In the case of this embodiment, the first superheater 14 is operated with steam from the first solar array 10, in that the steam after leaving the water separator 12 is separated into steam that is overheated in the first superheater 14 and subsequently fed to a high-pressure turbine 16 and steam that is used for the overheating. After the branching and before entering the first superheater 14, a throttling 34 is provided in the form of an isenthalpic throttling, in which the temperature of the steam before entering the first superheater 14 is lowered. In the first superheater 14 itself, with the enthalpy remaining the same a lowering of the pressure then takes place, thereby in turn increasing the temperature of the steam, which is subsequently fed to the high-pressure turbine 16. Provided between the high-pressure turbine 16 and the medium-pressure turbine 18 or low-pressure turbine 20 is a second superheater 28, which is likewise formed as a steam-steam heat exchanger and is operated with the steam branched off from the first solar array 10 for overheating the steam leaving the high-pressure turbine 16.

Figure 8:
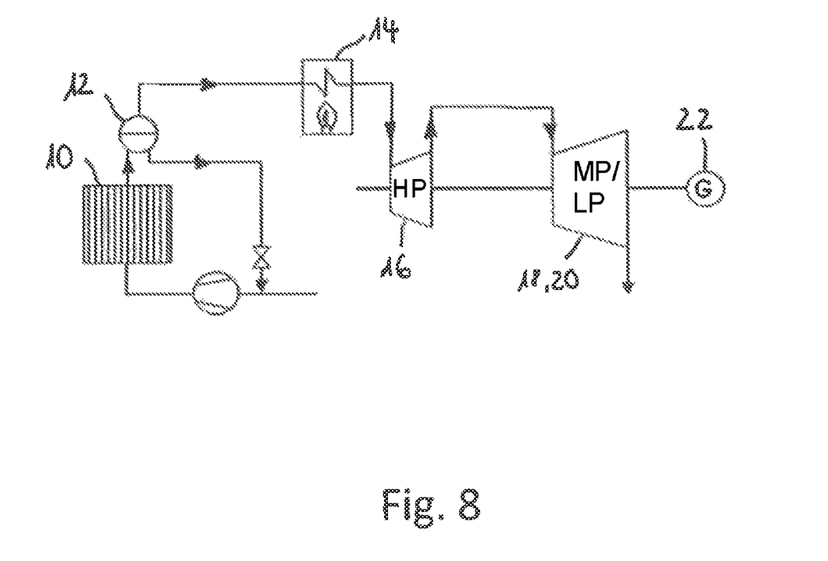
FIG. 8 shows a schematic representation of a solar thermal energy generating plant according to the invention in an eighth embodiment.

The eighth embodiment, shown in FIG. 8, has a first superheater 14, taking the form of a combustion chamber. An additional solar array is not necessary in the case of this embodiment.

Figure 9:
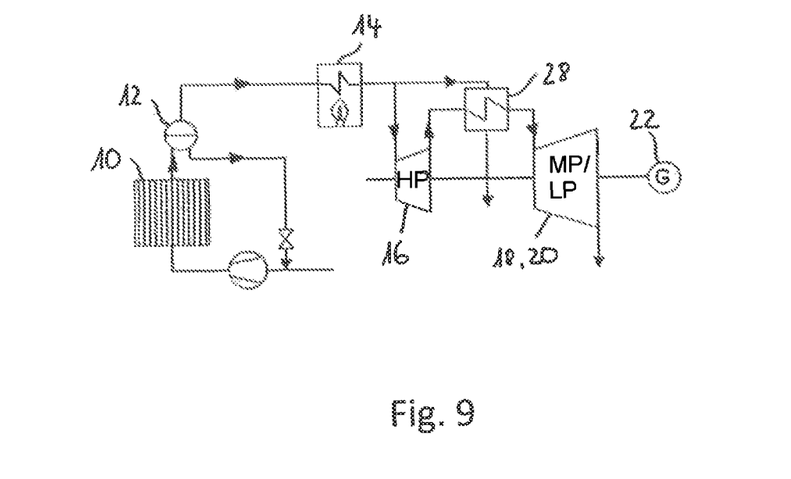
FIG. 9 shows a schematic representation of a solar thermal energy generating plant according to the invention in a ninth embodiment.

The ninth embodiment, shown in FIG. 9, likewise has a first superheater 14, taking the form of a combustion chamber. A second superheater 28, in the form of a steam-steam heat exchanger, is additionally provided between the high-pressure turbine 16 and the medium-pressure turbine 18 or the low-pressure turbine 20. This second superheater 28 is operated with a steam branched off from the steam leaving the first superheater 14, so that the steam leaving the high-pressure turbine 16 is overheated with an overheated steam leaving the first superheater 14 before entering the medium-pressure turbine 18 or low-pressure turbine 20.

Figure 10:
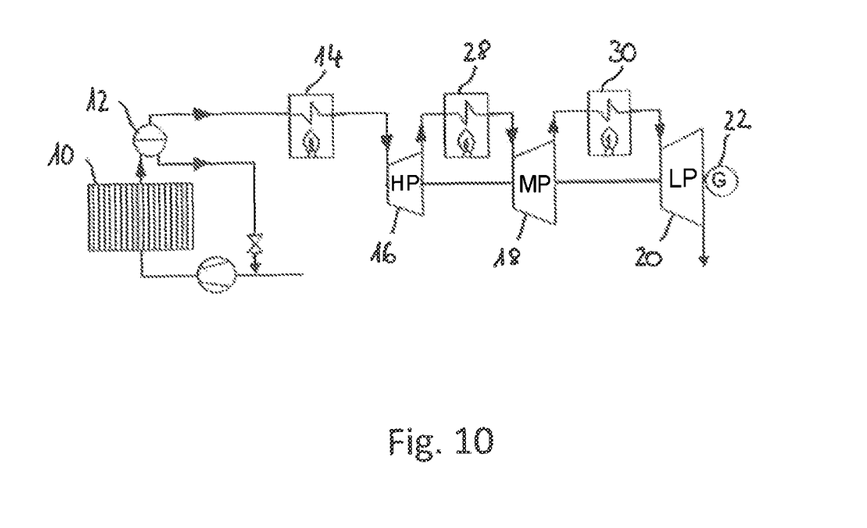
FIG. 10 shows a schematic representation of a solar thermal energy generating plant according to the invention in a tenth embodiment.

In the case of the tenth embodiment, shown in FIG. 10, a high-pressure turbine 16, a medium-pressure turbine 18 and a low-pressure turbine 20 are provided, the steam being overheated in a first superheater 14 before entering the high-pressure turbine 16, being overheated in a second superheater 28 before entering the medium-pressure turbine 18, and being overheated in a third superheater 30 before entering the low-pressure turbine 20. In this case, the first superheater 14, the second superheater 28 and the third superheater 30 respectively take the form of a combustion chamber.

Figure 11:
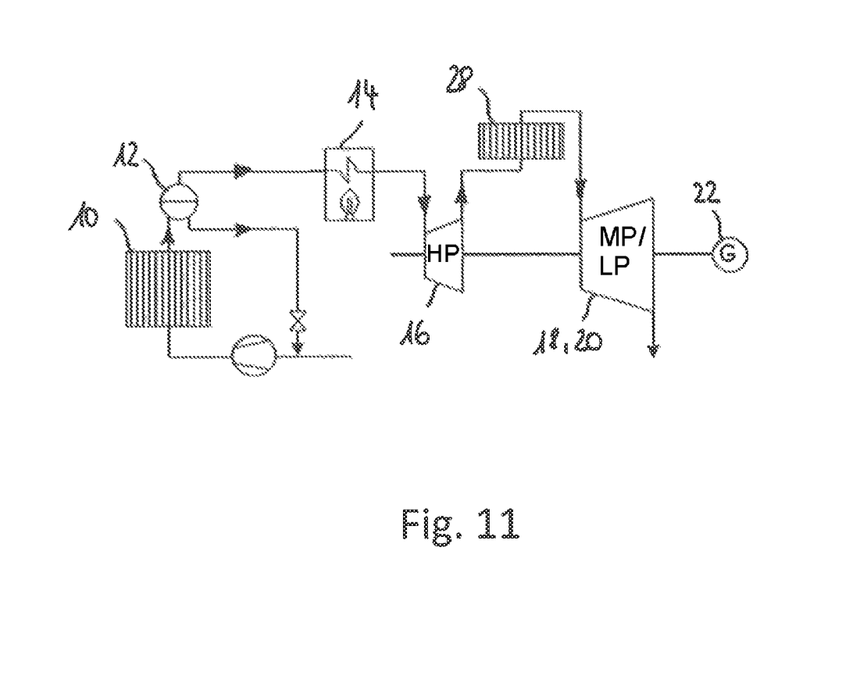
FIG. 11 shows a schematic representation of a solar thermal energy generating plant according to the invention in an eleventh embodiment.

FIG. 11 shows an eleventh embodiment, in which the first superheater 14 is formed as a combustion chamber and a second superheater 28 in the form of a second solar array is formed between the high-pressure turbine 16 and the medium-pressure turbine 18 or low-pressure turbine 20. Consequently, in the case of this embodiment, the steam leaving the high-pressure turbine 16 is conducted through a second superheater 28 in the form of a second solar array, in which the steam is overheated, before entering the medium-pressure turbine 18 or the low-pressure turbine 20.

Figure 12:
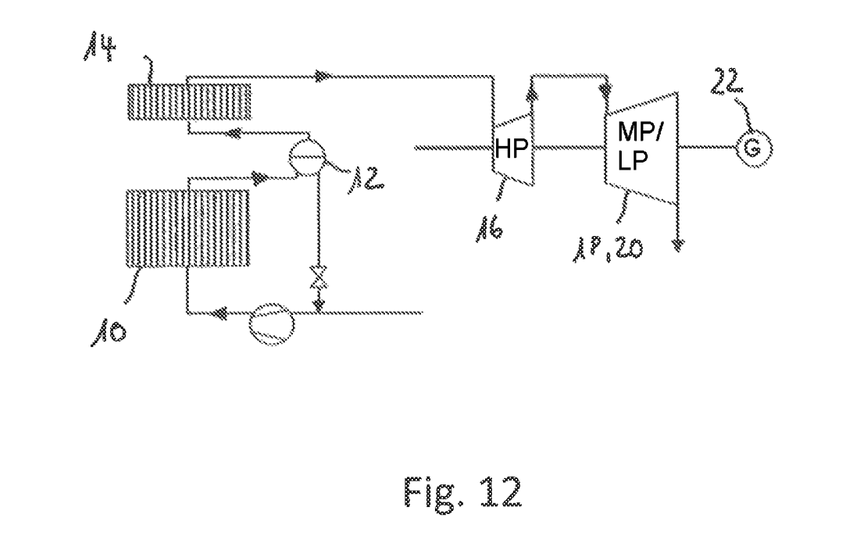
FIG. 12 shows a schematic representation of a solar thermal energy generating plant according to the invention in a twelfth embodiment.

FIG. 12 shows a twelfth embodiment, in which the first superheater 14 takes the form of a second solar array, so that the steam leaving the water separator 12 is fed to a second solar array and overheated there before entering the high-pressure turbine 16.

Figure 13:
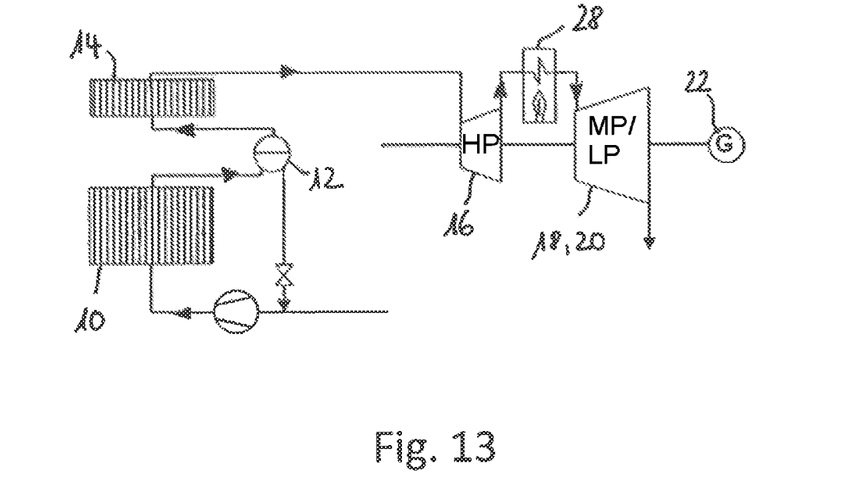
FIG. 13 shows a schematic representation of a solar thermal energy generating plant according to the invention in a thirteenth embodiment.

The thirteenth embodiment, shown in FIG. 13, corresponds substantially to the twelfth embodiment, shown in FIG. 12, a second superheater 28 in the form of a combustion chamber being additionally provided here between the high-pressure turbine 16 and the medium-pressure turbine 18 or the low-pressure turbine 20.

Figure 14:
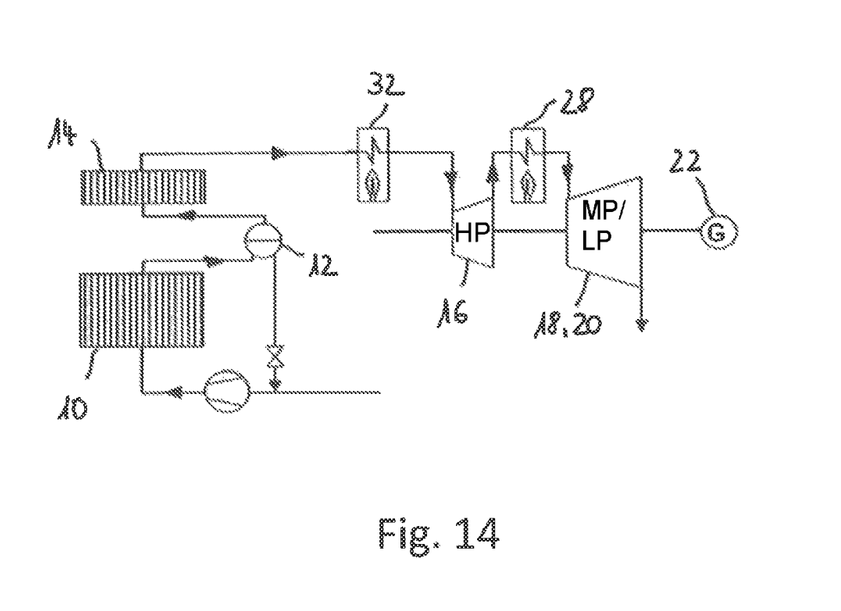
FIG. 14 shows a schematic representation of a solar thermal energy generating plant according to the invention in a fourteenth embodiment.

The fourteenth embodiment, shown in FIG. 14, corresponds substantially to the thirteenth embodiment, shown in FIG. 12, a combustion chamber 32 for conditioning the steam leaving the first superheater 14 before entering the high-pressure turbine 16 being arranged here downstream of the first superheater 14, formed as a second solar array.

Figure 15:
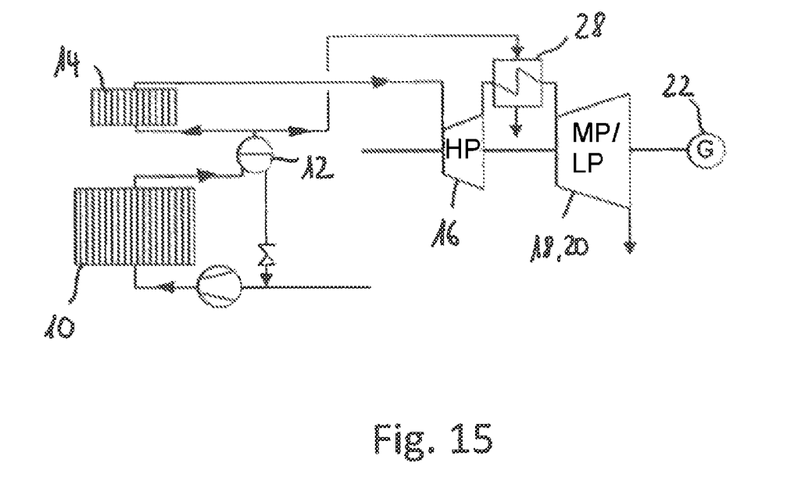
FIG. 15 shows a schematic representation of a solar thermal energy generating plant according to the invention in a fifteenth embodiment.

In the case of the embodiment shown in FIG. 15, the steam is divided after leaving the water separator 12, one part of the steam being fed to a first superheater 14, formed as a second solar array, and the other part of the steam being fed to a second superheater 28, formed as a steam-steam heat exchanger, in order to overheat the steam leaving the high-pressure turbine 16.

Figure 16:
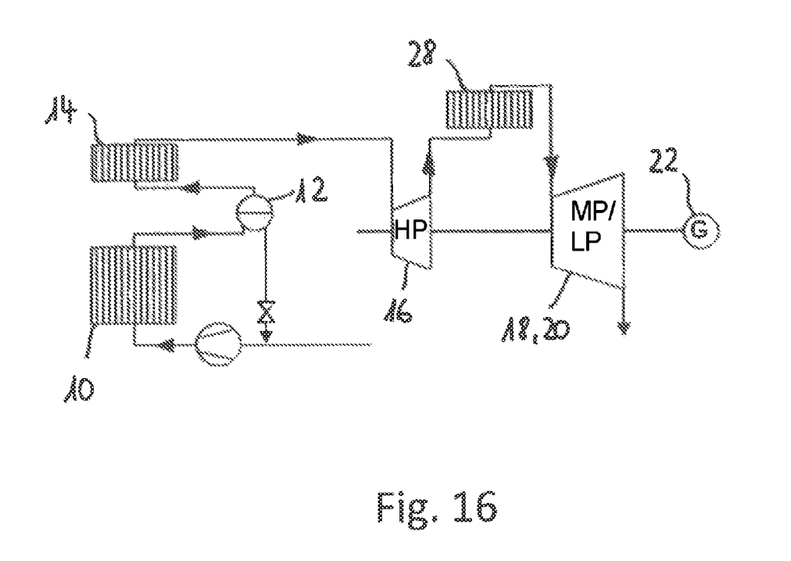
FIG. 16 shows a schematic representation of a solar thermal energy generating plant according to the invention in a sixteenth embodiment.

The sixteenth embodiment, shown in FIG. 16, corresponds substantially to the thirteenth embodiment, shown in FIG. 13, the second superheater 28 not being formed here as a combustion chamber but as a further second solar array.

The invention claimed is:
1. A solar thermal energy generating plant, comprising:
a first solar array, using water as a heat transfer medium;
a water separator, arranged downstream of the first solar array;
a high-pressure turbine;
a first superheater which overheats the steam leaving the water separator arranged between the water separator and the high-pressure turbine, wherein the first superheater is a steam-steam heat exchanger; and
an additional solar array which operates the steam-steam heat exchanger, wherein steam generated in the additional solar array has a higher temperature than steam generated in the first solar array, so steam leaving the first solar array can be overheated by the steam generated by the additional solar array.

2. The solar thermal energy generating plant as claimed in claim 1, wherein a medium-pressure turbine or a low-pressure turbine is arranged downstream of the high-pressure turbine, and a second superheater is arranged between the high-pressure turbine and the medium-pressure turbine or between the high-pressure turbine and the low-pressure turbine.

3. The solar thermal energy generating plant as claimed in claim 1, wherein a medium-pressure turbine is arranged downstream of the high-pressure turbine and a low-pressure turbine is arranged downstream of the medium-pressure turbine, a second superheater is arranged between the high-pressure turbine and the medium-pressure turbine and a third superheater is arranged between the medium-pressure turbine and the low-pressure turbine.

4. The solar thermal energy generating plant as claimed in claim 1, wherein a thermal storage unit or a seawater desalination plant or an adsorption refrigeration machine is arranged downstream of the high-pressure turbine, and a second superheater is arranged between the high-pressure turbine and the thermal storage unit or the seawater desalination plant or the adsorption refrigeration machine.

5. The solar thermal energy generating plant as claimed in claim 1, wherein a combustion chamber is arranged downstream of the first superheater formed as a steam-steam heat exchanger.

6. A method for obtaining energy in a solar thermal energy generating plant, the method comprising:
    generating steam in a first solar array, using water as a heat transfer medium;
    extracting a fraction of water from the steam with a water separator;
    overheating the steam in a first superheater, wherein the first superheater is a steam-steam heat exchanger operated by an additional solar array, wherein steam generated by the additional solar array has a higher temperature and a higher pressure than steam generated in the first solar array, so that the steam leaving the first solar array can be overheated by the steam generated by the additional solar array; and
    feeding the overheated steam to a high-pressure turbine.

7. The solar thermal energy generating plant as claimed in claim 1, further comprising a second superheater.

8. The solar thermal energy generating plant as claimed in claim 7, wherein the second superheater is a solar array.

9. The solar thermal energy generating plant as claimed in claim 8, wherein the second superheater is a steam-steam heat exchanger and wherein an additional solar array is provided, via which the steam-steam heat exchanger can be operated.

10. The solar thermal energy generating plant as claimed in claim 7 wherein a combustion chamber is arranged downstream of the first superheater and/or the second superheater.

11. The solar thermal energy generating plant as claimed in claim 7, wherein the second superheater is a combustion chamber.

12. The solar thermal energy generating plant as claimed in claim 7, further comprising a third superheater.

13. The solar thermal energy generating plant as claimed in claim 12, wherein the second superheater and/or the third superheater is/are a steam-steam heat exchanger and/or the second superheater and/or the third superheater is/are a solar array.

14. The solar thermal energy generating plant as claimed in claim 13, wherein the first superheater and/or the second superheater and/or the third superheater is/are a steam-steam heat exchanger and wherein an additional solar array is provided, via which the steam-steam heat exchanger can be operated.

15. The solar thermal energy generating plant as claimed in claim 12 wherein a combustion chamber is arranged downstream of the first superheater and/or the second superheater and/or the third superheater.

16. The solar thermal energy generating plant as claimed in claim 12, wherein the second superheater and/or the third superheater is/are a combustion chamber.

* * * * *